United States Patent [19]
Tiby

[11] Patent Number: 5,924,294
[45] Date of Patent: Jul. 20, 1999

[54] SELF-CONTAINED DEVICE FOR CONTROLLING LIMIT TEMPERATURE DURING THE TRANSPORT OF PERISHABLE FOODSTUFFS

[75] Inventor: Gerard Tiby, Sucy-En-Brie, France

[73] Assignee: Premark FEG L.L.C., Wilmington, Del.

[21] Appl. No.: 08/737,771

[22] PCT Filed: May 15, 1995

[86] PCT No.: PCT/FR95/00628

§ 371 Date: Feb. 3, 1997

§ 102(e) Date: Feb. 3, 1997

[87] PCT Pub. No.: WO95/31704

PCT Pub. Date: Nov. 23, 1995

[30] Foreign Application Priority Data

May 17, 1994 [FR] France ................................. 94 05998
Oct. 21, 1994 [FR] France ................................. 94 12631

[51] Int. Cl.⁶ ..................................................... F25B 49/00
[52] U.S. Cl. .............................................. 62/125; 116/217
[58] Field of Search ............................... 62/530, 529, 459, 62/125; 116/215, 216, 217; 374/106, 160; 426/88

[56] References Cited

U.S. PATENT DOCUMENTS 3,063,235  11/1962  Winchell ................................. 62/125
4,114,443   9/1978  Clark ..................................... 73/358

*Primary Examiner*—John M. Sollecito
*Attorney, Agent, or Firm*—Thompson Hine & Flory LLP

[57] ABSTRACT

Self-contained device and method for determining the variations in temperature regulated temperature enclosures. The device consists of a container comprising a tank connected to a receptacle, the inner spaces of which communicate with one another through one or two ducts of reduced or constricted cross sections. Said container is formed at least partially, of a material allowing heat transfer with the exterior and contains an intially solidified material, the melting temperature thereof being constant and the total volume being less than or equal to the overall volume of the tank and duct element.

22 Claims, 2 Drawing Sheets

$t_0$ $t_1$

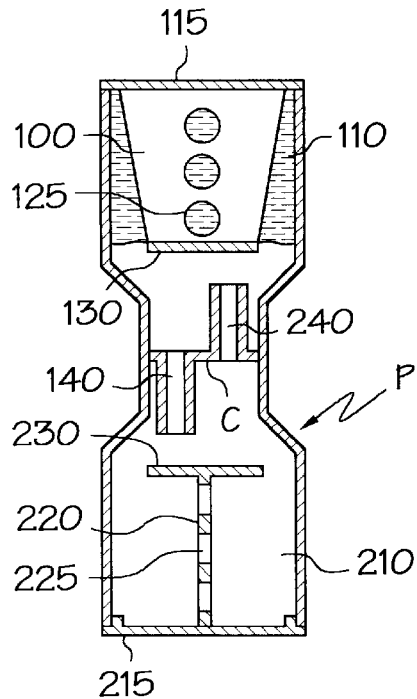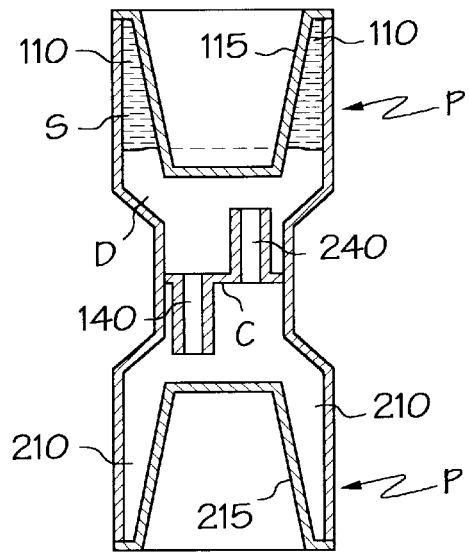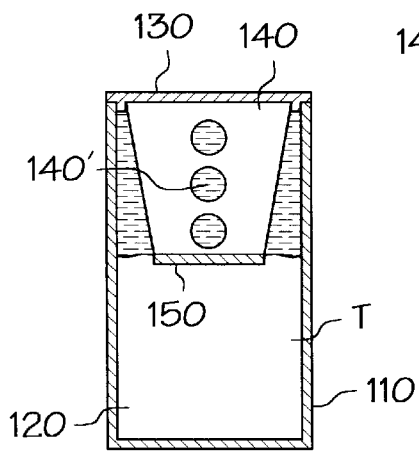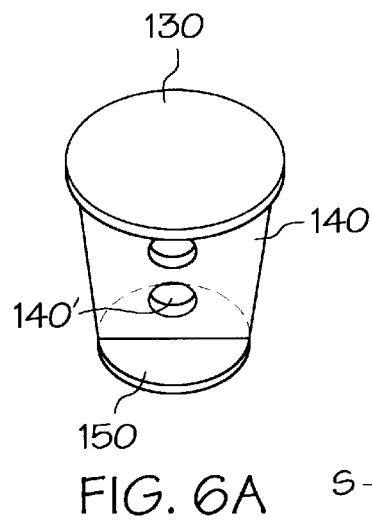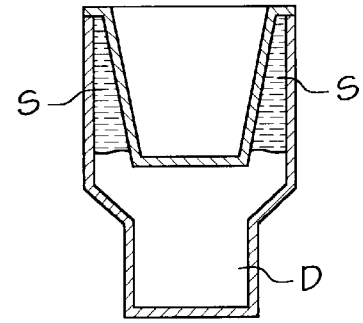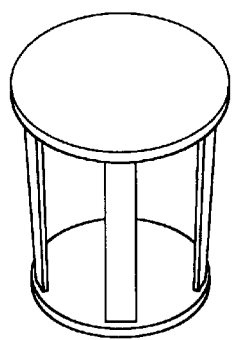
FIG. 3
FIG. 4
FIG. 5A
FIG. 6A
FIG. 5B
FIG. 6B

SELF-CONTAINED DEVICE FOR CONTROLLING LIMIT TEMPERATURE DURING THE TRANSPORT OF PERISHABLE FOODSTUFFS

The present invention relates to a means of checking for temperature deviations beyond the limits acceptable by regulations during transportation of perishable goods of the foodstuffs type or hygiene, pharmaceutical or diagnostic products.

When transporting perishable goods it is necessary to ensure that the standards governing the allowed temperature deviations for each product will in no case be exceeded during the transportation.

This type of check has been made mandatory in European countries, especially by Directive 92/1/EEC of Jan. 13, 1992, relating to deep-frozen food, which stipulates in its Article 2 that "while being used, the means of transportation and the local warehousing must be equipped with suitable instruments for the automatic recording of temperature in order to measure, frequently and at regular intervals, the temperature of the air to which deep-frozen goods intended for human consumption are subjected". Furthermore, Directive 93/43/EEC of Jun. 14, 1993 stipulates in its Article 3 that companies in the food sector must especially "demonstrate" the levels and moments (points) in the operation when there may be risks to the food, establish which points among those demonstrated are key for the safety of the food (critical points), and define and implement effective verification and monitoring procedures at these critical points. In this directive, it is strongly recommended that guides be put into place for good hygiene practices which should contain the measures necessary to guarantee the safety and wholesomeness of perishable goods.

In the light of this directive, those responsible for distribution and catering establishments and for traveling and occasional activities must carry out regular checks to verify that the goods conform to the provisions of the legislation in force. The checking means must then be put into place by the member states by directly following the directives or by using other scientifically valid methods on condition that the products and their transportation meet the regulations in force.

If a major risk associated with meeting the maximum temperature exists during transportation itself, the same risk exists before and after transportation, that is to say during loading, unloading, holding and storage periods.

The various checking and recording means made mandatory by Directive 92/1 in its Article 2 are the equipping of the transportation means and of the local warehousing with automatic temperature recorders which measure at regular intervals the temperature of the air to which the deep-frozen or refrigerated goods intended for human consumption are subjected; however, these apparatuses are often expensive and sophisticated and do not operate instantaneously, which makes their use and the checking of this use particularly difficult given the conditions of this type of goods and especially its geographical dispersion.

Throughout the foregoing and hereafter, the term "goods" will be used to mean any perishable foodstuff at a controlled temperature, especially deep-frozen products or refrigerated products, as well as products intended for human or animal health which also require being maintained at a controlled temperature for their proper preservation, especially therapeutic and diagnostic products; more generally, the term goods, to which mention will be made in this patent application, will refer to any type of product which it is mandatory to maintain at a certain temperature for regulatory reasons or for technical reasons associated with the preservation of an activity or integrity of said goods or for health reasons.

The device described hereinbelow and forming the subject of the present invention corresponds to the approach which is to comply with the requirements that may possibly arise in applying the European directives mentioned hereinabove, especially the HACCP (Hazard Analysis Critical Control Point) system.

The remainder of the description will be made with reference to the figures appended hereto, the descriptions of which are the following:

FIG. 1 is a diagrammatical representation of a device such that it can be in the initial state $t_0$ or in the final state $t_1$, FIG. 1a illustrating the initial state $t_0$ and FIG. 1b illustrating the final state $t_1$. The reservoir (1) and the element connecting the reservoir to the receptacle (2) contains the substance (4) in the solid state, and the receptacle (2) is empty. In the final state $t_1$, the content of the conduit (3) and partly or completely of the reservoir (1) has thawed and is found in the receptacle (2).

FIG. 3 represents a first preferred embodiment of the device,

Figure 1A:
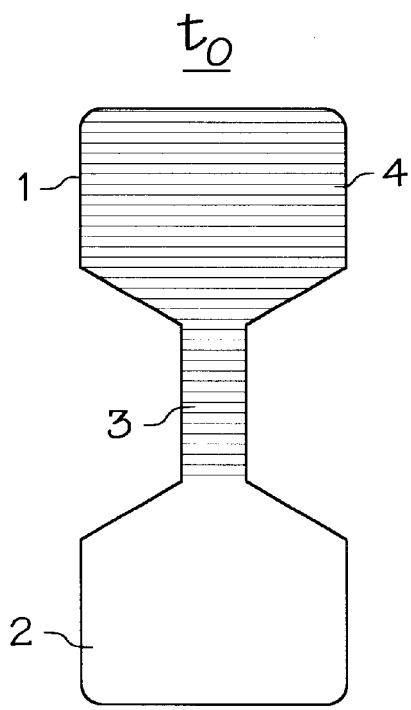

FIG. 4A represents a second preferred embodiment in which the ratio of the surface between the device and the ambient air to the volume of the reservoir is increased, FIG. 5 represents a simplified embodiment allowing detection of a temperature rise resulting in thawing of the substance; FIG. 5A shows a device which can be combined with that in FIG. 3 and FIG. 5B shows a device which can be associated with that in FIG. 4.

FIGS. 6A and 6B are two embodiment examples of plugs which can be fitted into the devices represented in FIGS. 3 and 5A.

The present invention relates to an autonomous device which checks for temperature deviations in a controlled-temperature enclosure, characterized in that it consists:

of a container comprising a reservoir connected to a receptacle whose internal spaces communicate with one another via at least one conduit having a smaller cross section or forming a restriction, said container being at least partly formed by a material allowing heat exchange with the outside, of a content consisting of an initially solid material whose melting temperature is constant and whose total volume is less than or equal to the overall volume of the reservoir and of the conduit element, of a means of filling the container.

The device of the invention is characterized in that, in the use position, the reservoir is approximately plumb with the receptacle, it being possible for the receptacle in turn to become the reservoir, and vice versa, by turning it upside down or pivoting it through 180°.

In a preferred embodiment, the reservoir and the receptacle may communicate with one another via two conduits arranged in such a way that the material can flow from the reservoir into the receptacle by one of them and that simultaneously the air forced out of the receptacle can return into the reservoir, the pressure in the reservoir and in the receptacle thus remaining identical whatever the manner of flow of said material.

It may be advantageous, in a certain embodiment, for the reservoir to include a means which allows the material in the solid state to be correctly held in place and avoids the risk, due to the effect of gravity, of blocking off one or other of the conduits. This means consists of a surface whose plumb line at the perimeter lies outside the perimeter of the conduit or conduits for communication between the reservoir and the receptacle, said surface being fixed to the reservoir by any suitable means; this means may be:

- a plane or curved surface, which is provided with perforations, rugosities, hooks or any other means of increasing the frictional forces between the material in the solid state and the constituents of the reservoir;
- parallel or crossed strips holding the surface in place in the reservoir while at the same time allowing the possibility of the initially solid material to flow out freely in the event of melting.

The reservoir becomes the receptacle by turning it upside down, and vice versa. The device is therefore symmetrical about a horizontal plane.

The means of filling the device according to the invention is either an orifice capable of being plugged or a leaktight system for fixing the receptacle to the reservoir.

Advantageously, reservoir and receptacle are closed by a plug to which the surface for holding the material in place is fixed. Reservoir and receptacle may also be fixed together in the region of the central axis of symmetry, especially by screwing or interlocking.

Finally, the reservoir and the receptacle may include graduations allowing the product [duration×temperature] of an excursion above the melting temperature to be quantified.

The invention also relates to an autonomous device which checks for temperature deviations in a controlled-temperature enclosure, characterized in that it consists, on the one hand, of a container comprising a reservoir connected to a receptacle whose internal spaces communicate with one another via two conduits having a smaller cross section, said container being at least partly formed by a material allowing heat exchange with the outside, on the other hand, a content consisting of an initially solid material whose melting temperature is constant and whose total volume is less than the overall volume of the reservoir.

One of the conduits enables the substance to flow from the reservoir into the receptacle and the other conduit enables the air in the receptacle to escape into the reservoir.

The invention also relates to a device characterized in that the reservoir is provided with a means of retaining the substance in the solid state in the top part of the device.

This retaining means may consist of a plate, provided with perforations or asperities, and of a surface approximately perpendicular to the direction of gravity and whose perimeter is such that the melted substance can flow from the reservoir into the receptacle along the wall of the reservoir without the risk of directly blocking the two conduits.

The device whose general characteristics are described hereinabove is more particularly characterized in that the material is a eutectic. The eutectic is a mixture of two or more constituents having a melting point which is not necessarily below those of the constituents but which is always at a fixed temperature and has a constant composition for a given mixture; a substance in the pure state, such as, in particular, water, fulfills the same function, which is the constancy of its melting temperature at a given pressure when it has been frozen beforehand; thus the substance contained in the device of the present invention may also be a substance in the pure state from the moment when its melting temperature is constant under defined ambient pressure conditions; the term eutectic used hereafter will be either a eutectic as defined hereinabove or any substance having the same properties.

By substance is meant any material, with which the content of the device is provided, having the desired property, which is that of a eutectic or of a pure substance.

The content of the device will therefore be designated by one of the three terms, material, substance or eutectic, and will always have the same melting property at a constant temperature, said temperature lying generally between −40° C. and +20° C.

Such a device may be placed in an enclosure whose ambient temperature it is desired to control; the upper cavity or reservoir is then filled with a defined eutectic whose melting temperature is (t°f); if this entire device is subjected beforehand to a temperature of less than (t°f), the eutectic will be in the solid state; it is obvious that if it is subjected to an ambient temperature (t°a) greater than (t°f), the eutectic will liquefy and the liquid phase will, due to gravity, end up being housed in the lower cavity or receptacle; it is therefore simply by the action of gravity that the melted eutectic, due to the action of a temperature evolution above the melting temperature of the eutectic, will accumulate in the receptacle, and the quantity of eutectic present at a given moment in said receptacle is then an indicator of the product of the difference in temperature between (t°a) and (t°f) and the time during which the enclosure in which the device is arranges has been outside the limit controlled temperatures permitted by the standards for preservation of the products contained in said enclosure.

The volume of substance collected in the receptacle will therefore increase:

- as the difference dθ between the ambient temperature (t°a) and the temperature (t°f) increases,
- with the time dt during which dθ is positive,
- with the latent heat of fusion Cf of the substance,
- as the average overall heat transfer coefficient K of the device increases.

The coefficient K is defined in the decree of Feb. 1, 1974, published in the Official Journal of the French Republic on Mar. 20, 1974 and defined by the following formula:

$$K = \frac{W}{S} d\theta$$

where

W is the thermal power dissipated inside the device and

S is the surface for exchange between the device and the enclosure whose temperature is to be monitored.

It is clear that, since the volume is proportional to W, the greater the surface for heat exchange with the outside compared to the volume of the substance the smaller the overall heat transfer coefficient.

If Qe is the quantity of energy exchanged between the ambient medium of the controlled-temperature enclosure and the device, the following formula may therefore be applied in order to know to this quantity:

$$Qe = K \int_o^t (d\theta \times dt)$$

The mass of the substance collected in the receptacle, called mr, is proportional to Qe and inversely proportional to Cf, that is to say to the latent heat of fusion of the substance, according to the formula:

$$mr = \frac{Q_e}{C_f}$$

It is obvious that this device, which integrates both the excursion temperature and the excursion time, is representative of an actual situation which is an integration of the overall state in which the goods present inside the controlled-temperature enclosure have been outside the standards for preservation of said goods.

The eutectic substances which advantageously can be used are the substances which have a melting point at a negative temperature in the case of checks on controlled-temperature enclosures allowing preservation of frozen or deep-frozen products, or a substance whose melting temperature lies at 0° and 8° in order to check temperatures in controlled-temperature enclosures intended for preserving chilled products; of course, it is quite conceivable to equip controlled-temperature enclosures with eutectics having melting temperatures greater than 8° in the case of goods whose preservation, above 8°, nevertheless requires temperature stability. Mention may be made, by way of example, of certain types of cheeses or wines whose preservation temperature may lie between 10° and 20°.

By way of example of eutectics which can be used, mention may be made of eutectics of the Alcal type, especially Alcal 8, which is marketed by the company SOFRIGAM, 88 rue Danton, 92400 Courbevoie, France, or more generally of any liquid eutectic whose composition may advantageously be used in the device of the invention, especially those whose melting temperature lies between −40° C. and +20° C.

In one embodiment of the device according to the invention, the reservoir and the receptacle are made of a transparent or translucent material making it possible to see the presence or absence of the eutectic either in the frozen state or in the liquid state; this material may be a plastic or a composite, such as crystalline PVC, crystalline polyethylene or polypropylene; the choice of material depends on the temperature of the enclosure housing the device and the person skilled in the art will know how to find the transparent or translucent material most suited to the application of the device.

Optionally, the reservoir and/or the receptacle may be provided with graduations intended for precise measurement of the volume of the substance which they contain or which they are likely to contain after a situation in which the melting temperature is exceeded.

Also advantageously, the substance may be colored, each color corresponding to a given eutectic and consequently to a given melting temperature; thus each excursion above a limit temperature corresponding to the melting temperature of the eutectic may be associated with a color possibly present in the receptacle of the device.

Optionally, and guided by certain types of uses, the device of the invention which enables the product (dθ×dt) to be measured may be combined with a thaw telltale. This telltale consists of a closed container and of a means enabling the eutectic to be maintained in the solid state in the upper part of said container. This means may be a plate provided with perforations or with asperities, or it may be a mesh or any means, especially those described for the reservoir of the main device, whose function is to retain the eutectic in the solid state in the upper part of the container. If the melting temperature has been exceeded, a certain quantity of eutectic will then be present in the bottom region of the container.

This type of device may have a greater or lesser surface for heat exchange with the controlled-temperature enclosure depending on the type of response desired.

It is also possible to imagine that a controlled-temperature enclosure may contain several devices according to the invention, each device itself being characterized by the presence of a eutectic with a defined melting temperature, each being different from the others and recognizable, for example, by its color or by a marking on the device. It will thus be easy for the user to determine the maximum temperature reached in the enclosure between two times $t_0$ and $t_1$, for example.

In the light of the foregoing, and especially of the formula indicating the quantity of energy exchanged between the ambient medium and the device, it is obvious that the volume of eutectic collected in the receptacle is a function of the product [dθ×dt], dθ representing the temperature difference between the ambient temperature and the melting temperature of the substance and dt representing the time during which dθ is positive.

A device according to the invention comprising only a single conduit is also characterized in that said connecting conduit between the reservoir and the receptacle is made of a material having a high thermal conductivity, especially a metal, a metal alloy or a plastic or a combination of these; this conduit will preferably be filled over its entire length with the substance, but it may only be filled partially.

Figure 2A:
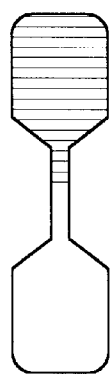
FIG. 2 represents the various types of configuration, FIG. 2A being a configuration allowing detection of a rapid temperature rise lasting for a short time, FIG. 2B allowing detection of a temperature increase of greater or lesser magnitude but lasting for a longer time and FIG. 2C being a combination of the previous two.
Figure 2B:
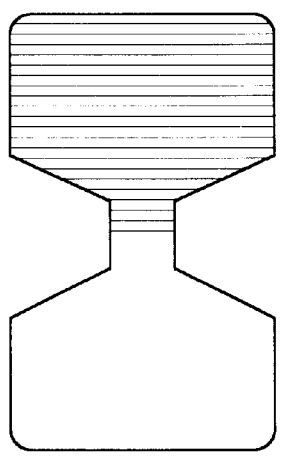

With regard to the various physical and especially geometrical parameters of the device comprising these three elements, reservoir, receptacle and connecting element, the person skilled in the art will be able to adapt the device to his requirements: if, for example and in a nonlimiting manner, he wishes to check for an excursion to a relatively high temperature for a very short time, the device will have a small overall volume and especially a small volume of eutectic, as shown in FIGS. 2A and 4, allowing significant and rapid heat exchange with the outside; if, on the contrary, the person skilled in the art seeks to measure a smaller excursion but of long duration, it will then be advantageous to have a geometrical configuration of the device allowing a large volume of substance in the reservoir, as is shown in FIGS. 2B and 3.

Figure 2C:
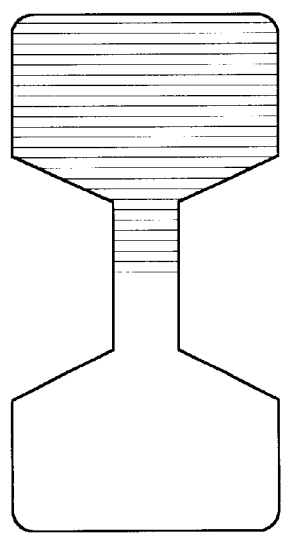

Finally, if the person skilled in the art wishes to combine these two objectives, namely to check at the same time for an excursion to a high temperature for a long time, it will be necessary for the device to be formed in such a way that it can contain a large volume of substance in the reservoir but also have a connecting element having a high ratio of exchange surface to eutectic volume, as is shown in FIGS. 2C or 3.

The person skilled in the art will easily be able to design the geometry of the device in accordance with a given objective.

This device of the invention also has the advantage of being inexpensive to manufacture and also of being able to be used a large number of times since it only remains to refreeze the substance when it is in the liquid state in the receptacle and then to return to the original position by turning it through 180° before using it again. Finally, in order to comply with the safety standards and with good hygiene practices, this device may also be combined with another, foolproof device which excludes the possibility of turning the device upside down when it is in service.

If it is necessary, a simplified device, such as that shown in FIG. 5, enables the existence of a positive Δθ to be measured independently of the Δt: this device consists only of a container which, like the previous devices, is made of a material allowing good heat exchange with the outside and of a content consisting of a solidified substance positioned in such a way that its liquefaction is visible or measurable.

The two embodiment examples hereinbelow will enable the reader to appreciate better all the advantages of this type of device. Two geometrical examples are indicated, but of course the person skilled in the art will be able to adapt the geometry of this device according to the precise requirement in terms of the temperature deviations which he wishes to monitor in a given controlled-temperature enclosure.

Embodiment Example No. 1

This example is illustrated in FIG. 3. The reference numbers have three numerals, the first numeral, that in the hundreds, is 1 for any element relating to the reservoir and 2 for any element relating to the receptacle, the two following numerals (tens and units) are strictly identical for the mutually symmetrical elements lying between those of the reservoir, when they are in the top position, and those of the receptacle, when they are in the bottom position.

The device (D) consists of a reservoir (110) and of a receptacle (210) consisting of a wall (P) in a transparent or translucent material having a high conductivity and being resistant to temperature deviations, of a partition (C) separating the reservoir (110) from the receptacle (210), the partition (C) being the support for the conduit (140) which enables the eutectic to flow from the reservoir (110) to the receptacle (210) and for the conduit (240) allow [sic] air to escape from the receptacle into the reservoir.

Fixed to a cover (115) or (215) is a wall (120) or (220), which wall is perforated by holes (125) or (225) and is fixed to a surface (130) or (230), the plumb line of the perimeter of which is outside that of the two conduits (140) and (240). Preferably, the surface (130) or (230) is a circular surface having a diameter of 14 mm, approximately the same diameter as the partition (C).

The eutectic in the frozen state in the reservoir (110) occupies the volume lying between the cover (115), the surface (130) and the wall (P). When the temperature exceeds the melting temperature of the eutectic, the element [sic] the melted eutectic flows between the surface (130) and the partition (C) along said partition in order to flow through the conduit (140) into the receptacle (210).

The conduit (240) connecting the receptacle to the reservoir allows the air to escape from the receptacle (210) into the reservoir (110) simultaneously with the flow of the eutectic from the reservoir (110) to the receptacle (210). The short distance (in this case, 5 mm) between the upper part of the conduit (240) and the surface (130) prevents the eutectic from flowing through both conduits at the same time and therefore makes it possible to maintain an equal pressure between the reservoir (110) and the receptacle (210) throughout the use of the device (D).

The internal diameter of the two conduits (140) and (240) must be sufficiently large, even in the case of high viscosities of the liquefying eutectic, to prevent said conduits from clogging. The device (D) in FIG. 3 is a device for which the size ratio total height/diameter is about 3 mm [sic].

However any overall geometrical modification, such as that shown in FIG. 2, is, of course, conceivable in this type of device.

The perfect symmetry of the system in the case of turning it upside down is again apparent here on examining the figure.

Embodiment Example No. 2

This example is illustrated in FIG. 4.

The principle of the numbering of the elements of the device illustrated in this figure is the same as that in FIG. 3.

The essential difference between the two devices is the geometry which allows a greater surface for heat exchange with the enclosure.

The device (D) consists of a reservoir (110) and of a receptacle (210) which consist of a wall (P) in a transparent or translucent material having a high conductivity and being resistant to temperature deviations, a partition (C) separating the reservoir (110) from the receptacle (210), the partition (C) being the support for the conduit (140), enabling the eutectic to flow from the reservoir into the receptacle, and (240) enabling the air to escape from the receptacle into the reservoir.

The covers (115) and (215) are made up in such a way that once they have been fixed these covers (115) or (215) form another wall allowing heat exchange between the substance (S) and the ambient environment in such a way that the ratio of the volume of substance (S) to the surface for heat exchange with the ambient environment is increased compared to the device shown in FIG. 3.

The elements of conduits (140) and (240) are identical and fulfill the same function as in the previous embodiment.

In this example, the substance flows from the reservoir into the receptacle for a product $\Delta t \times \Delta \theta$ which is much smaller than in the previous example.

Simplified Embodiment Example

This example is shown in FIG. 5; FIG. 5A represents a container provided with a cover which is identical or similar to that of the device in FIG. 3 and FIG. 5B represents a device similar to the reservoir in FIG. 4, except that there is no conduit allowing flow of the substance. This type of simplified device makes it possible to detect the existence of a temperature rise by observing the liquefaction of the substance, which takes into account neither $\Delta t$ nor $\Delta \theta$. It may be used alone or combined with a device such as shown in either of FIGS. 3 and 4 as a telltale of the presence or absence of thawing.

FIGS. 6A and 6B represent, without any geometrical limitation, plugs which can be fitted into the devices in FIGS. 3 and 5A.

The present invention also relates to a method of checking that the temperature in a controlled-temperature enclosure intended to contain perishable goods has been maintained between two times $t_0$ and $t_1$, and consisting of:

a) putting into this enclosure (apart from that with which it is already provided) a device as described hereinabove in which the substance has a melting temperature chosen depending on the controlled temperature required, this substance being initially, at time $t_0$, in the entirely solid state in the reservoir and, where appropriate, in a conduit element;

b) observing at time $t_1$ the presence or absence of substance in the receptacle;

c) where appropriate, measuring the quantity of material in the receptacle and correlating said measurement with unauthorized temperature excursions in the enclosure at at least certain moments between times $t_0$ and $t_1$.

The method according to the invention is also characterized in that the substance has a constant melting point at given pressure conditions and perhaps [sic] either a eutectic mixture or a pure substance.

In the method of the invention, the melting temperature of the substance is greater than or equal to the maximum temperature allowed for preservation of said perishable goods; according to this same method, the connecting conduit is filled with the substance and is made of a material having a high thermal conductivity, especially a metal or a metal alloy, thus allowing, in the event of variation in temperatures, the substance to be acted upon rapidly, resulting in it melting and flowing into the receptacle; as was stated earlier, depending on whether it is desired to detect a rapid rise of short duration, a rapid rise of long duration or simply one of long duration, the person skilled in the art will, in implementing his method, choose the device appropriate to the results sought, by adjusting the ratio between the heat exchange surface and the volume of substance contained in said device.

The geometry of the device will be chosen depending on whether it is desired to detect high or low values of ($\Delta t \times \Delta \theta$), as illustrated in FIGS. 1 to 4. It may also be chosen so as to detect only positive values of $\Delta \theta$, independent of $\Delta t$, as illustrated in FIGS. 5A and 5B.

In the same way, the longer the $\Delta t$ values it is desired to detect the greater are the reservoir and receptacle volumes chosen.

A complementary and novel feature of the method of the invention is that, in the case of an observed transfer of substance from the reservoir into the receptacle at the end of an operation to monitor compliance with the temperature standards, it is possible, after complete melting of the still solid material contained in the reservoir and then resolidification of the transferred material, to employ said device for another monitoring operation, as long as the receptacle, then filled with solid material, is used as the reservoir and the old receptacle, then empty, is used as the receptacle.

In an improvement of the method of the invention, several devices may be used simultaneously in the same given controlled-temperature enclosure, each device itself being characterized in that it contains a substance having a defined melting temperature different from the others; as was explained above, each melting temperature of the substance may be characterized by a given color; thus, the person skilled in the art will be able, after time $t_1$, to determine the maximum temperature range to which the enclosure has been subjected: if, for example, the substances whose melting temperatures are less than $-8°$ have been completely or partially liquefied while the substances whose melting temperatures are greater than $-5°$ have not been, it will be known that the enclosure will have been brought to an ambient temperature between $-8°$ and $-5°$ for a certain time.

The method of the invention may, of course, be combined with any method using another system for checking the temperature, of the recording thermometer type, or self-adhesive indicators of the ThawAlert type manufactured by the company Thermax and marketed by "Etoile Internationale", 111 rue Cardinet, 75017 Paris, FRANCE.

Another particular example of such a combination is the use of a device according to the invention with, optionally, a device such as described in FIG. 5A or FIG. 5B. This device is a telltale which makes it possible to verify, simply by glancing at it, whether a given temperature has been exceeded at a given moment or not, from the time when the critical temperature not to be exceeded is the same as the melting temperature of the substance contained in the device. In FIG. 5A, this telltale device (T) consists of a container consisting of a wall (110), of a cover (130), which may or may not be sealed, and of an internal space (120). Two representations of the cover are depicted in FIGS. 6A and 6B. Fixed to the outer wall (110) or the cover (130) is a wall provided with holes or asperities, in this case holes (145), a surface (150) being attached to said wall, as in the reservoir of the previous example. The eutectic where [sic] the substance introduced beforehand into the space (120) is solidified and held in place in the upper part of the telltale (T) in the space lying between the cover (130) and the surface (150). Should the critical temperature, which is the melting temperature of the substance, be exceeded, said substance falls, due to gravity, into the lower part of the device.

FIG. 5B is a representation of a device having a large surface for heat exchange with the outside.

The combination of such a telltale device with the device (D) as described and shown in FIG. 3 or 4 makes it possible to have both a binary-type response, indicating whether or not a critical temperature has been exceeded, by virtue of the telltale (T), and a quantitative response with regard to the duration and the temperature difference by means of the product $\Delta t \times \Delta \theta$.

In certain cases of simplified use, the use of the telltale alone may be sufficient if the simple fact of having exceeded the critical temperature is sufficient to make a decision with regard to the quality of the goods transported.

Finally, the device (D) or the telltale (T) may advantageously be used with heat-sensitive inks which change color with temperature, such as those marketed, for example, by the company OMNIA CHEMIE, Gorsenkelhen 45, D-4030 Ratingen 1 (Germany).

The invention finally relates to the use, in order to check that the temperature in a controlled-temperature enclosure has been maintained between two times $t_0$ and $t_1$, of a device consisting of a reservoir, a receptacle and one or two hollow connecting elements, the reservoir being upstream of the receptacle in consideration of the gravitational forces, said reservoir and the element being completely or partly filled with a substance in the solid state and having a melting temperature which is constant at a given pressure, as defined earlier.

The invention also relates to the use of a device consisting of a reservoir, a receptacle and two hollow connecting elements, the reservoir being upstream of the receptacle in consideration of the gravitational forces, said reservoir being partially filled with a substance in the solid state having a melting temperature which is constant at a given pressure; the receptacle and the reservoir are connected by two hollow connecting elements, one of which enables the substance to flow from the reservoir into the receptacle and the other enables, simultaneously, the air in the receptacle to pass into the reservoir.

The device of the invention may be used either alone or in combination with various devices of the same type but having, as contents, substances possessing different melting temperatures or with other types of temperature checking, especially devices providing a memory of the duration and of the differences in temperatures to which it has been possible to subject the checked enclosures. It will, in particular, be beneficial in some cases to use this type of device in combination with recording thermometers or else with colored patches, the color of which changes irreversibly depending on the temperature.

The person skilled in the art will easily be able to design this type of device either integrated irreversibly in the enclosure, the temperature of which has to be monitored, or reversibly so that it can be reused.

The example of use hereinbelow illustrates, in a precise but nonlimiting manner, the benefit of the device, the method and the use of this device, these being the subjects of the present invention.

Examples of Use

Figure 1B:
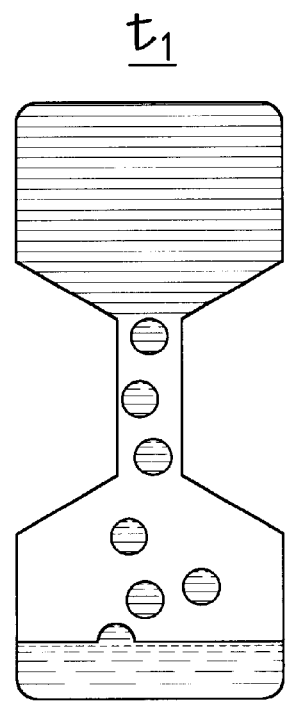

Referring to FIG. 1, a telltale prototype has been produced in which the reservoir (1) and the receptacle (2) are made of transparent plastic and have a height of about 35 mm each and a diameter of about 16 mm; the reservoir and the receptacle are connected together by a stainless steel tube having a diameter of about 2.5 mm and a length of about 30 mm. The reservoir (1) has been filled with water (4) and then maintained at a negative temperature in such a way that all the water is converted into ice. This telltale was then placed in an ambient temperature of +20°.

After approximately 4 minutes, the ice contained in the steel tube starts to liquefy and flow drop by drop into the receptacle (2). If the telltale is maintained at this ambient temperature, the ice will continue to liquefy and flow drop by drop; the time necessary to empty the reservoir (1) under the geometric conditions described hereinabove is about 35 mn.

When the telltale is placed at temperatures different from 20°, the rate of flow is then approximately proportional to the temperature difference with respect to 0°, verifying that the volume of water collected is proportional to the temperature difference between the ice and the ambient temperature, as well as to the duration of exposure to temperatures for which this temperature difference is positive.

In contrast, the liquefaction phenomenon stops when the telltale is put back to a negative temperature.

The above description clearly shows that this system has many advantages for checking the temperature during transportation of perishable goods in controlled-temperature enclosures, the main advantages being and, [sic] without limitation:

the low production cost of this type of device, the possibility of reusing this type of device indefinitely, the possibility for the person skilled in the art to adapt the geometry of the container of the device and the nature of the substance contained in the device to the specification defined country by country with regard to good hygiene practices in the case of transportation of perishable goods.

This device may be either moveable with, however, as an option, a foolproof device which does not allow the apparatus to be turned upside down when it is in service, and may be combined with any type of device which preserves the memory of the various phases of temperature and of duration through which the ambient environment of the enclosure has passed during the observed duration.

I claim:

1. An autonomous device which checks for temperature deviations in a controlled-temperature enclosure, comprising a container comprising a reservoir connected to a receptacle whose internal spaces communicate with one another via two conduits having a smaller cross section, said container being at least partly formed by a material allowing heat exchange with the outside;

at least one filling means for filling the container; and a content consisting of a solidified substance whose melting temperature is constant and whose total volume is less than the overall volume of the reservoir, wherein the reservoir is provided with a retaining means to maintain the substance in the solid state, the retaining means consisting of a plate provided with perforations or asperities, and of a surface approximately perpendicular to the direction of gravity and whose perimeter is such that the melted substance can flow into the receptacle along the wall of a the reservoir without the risk of directly blocking the two conduits.

2. The device according to claim 1, wherein one of the conduits enables the substance to flow from the reservoir into the receptacle and the other conduit enables the air in the receptacle to flow into the reservoir.

3. The device of claim 1 wherein said device is employed such that the reservoir is approximately plumb with the receptacle, it being possible for the receptacle in turn to become the reservoir, and vice versa, by turning the device upside down or pivoting the device through 180°.

4. The device according claim 1, wherein the means for filling the container is either an orifice capable of being plugged or a leaktight system for fixing the receptacle to the reservoir.

5. The device according to claim 1, wherein the substance is a eutectic and has a melting temperature which lies between −30° and +20° C.

6. The device according to claim 1, wherein the reservoir and the receptacle are made of a transparent or translucent material of a plastic or composite type.

7. The device according to claim 1, wherein, the connecting conduit is made of a material having a high thermal conductivity, said material being selected from the group consisting of a metal, a metal alloy, a plastic or a combination of thereof.

8. The device according to claim 1, wherein the conduit is completely filled with said substance.

9. The device accordingly to claim 1, wherein the receptacle includes graduations enabling the volume of substance which has flowed from the reservoir into the receptacle to be measured, said volume being a direct function of the product $\Delta t$ to $\Delta \theta$, $\Delta \theta$ representing the temperature difference between the ambient temperature and the mailing temperature of the substance, $\Delta t$ representing the time during which $\Delta \theta$ is positive.

10. A method of checking that the temperature in a controlled-temperature enclosure has been maintained between times $t_0$ and $t_1$, said method comprising the steps of:

a) putting into said enclosure an autonomous device according to claim 1 wherein the material has a melting temperature chosen depending on the controlled temperature required, said substance being initially, at time $t_0$, in the entirely solid state in the reservoir and in the conduit;

b) observing, at time $t_1$, the presence or absence of said substance in the receptacle; and c) measuring the quantity of said substance in the receptacle, wherein said measurement is correlated with temperature excursions in the enclosure at at least certain moments between times $t_0$ and $t_2$.

11. The method according to claim 10, wherein the melting temperature of the substance is greater than or equal to the maximum temperature allowed for preservation of said perishable goods.

12. The method according to claim 10, wherein the reservoir and the receptacle are made of a transparent to translucent material of a plastic or composite type.

13. The method according to claim 10, wherein at time $t_0$ the conduit is filled with the substance.

14. The method according to claim 10, wherein the difference in pressure between the receptacle and the reservoir is zero, the flow of the substance from the reservoir into the receptacle being compensated for by air in the receptacle escaping into the reservoir.

15. The method according to claim 10, wherein the device has a geometry characterized by a ratio between a surface for heat exchange with the controlled temperature enclosure and a volume of substance determined as a function of the product ($\Delta t \times \Delta \theta$) at which it is desired to detect, $\Delta \theta$, being the temperature excursion between the maximum temperature allowed in the enclosure and the melting temperature of the material, $\Delta t$ being the duration of the temperature excursion $\Delta \theta$.

16. The method according to claim 10, wherein the volume of material collected in the receptacle is a function of the product ($\Delta t \times \Delta \theta$); $\Delta \theta$ representing the temperature difference between the ambient temperature and the melting temperature of the substance; and $\Delta t$ representing the time during which $\Delta \theta$ is positive.

17. The method according to claim 10 wherein the longer the $\Delta t$ values it is desired to detect, the greater are the reservoir and receptacle volumes chosen.

18. The method according to claim 10, wherein, in the case of an observed transfer of substance from the reservoir into the receptacle during an operation to monitor compliance with the temperature standards, said device, after complete liquefaction of the still solid substance contained in the reservoir and then solidification, is used for another monitoring operation, as long as the receptacle, then filled with solid substance, is used as the reservoir and the old receptacle, then empty, as the reservoir.

19. The method according to claim 10, wherein one or more devices are used in a given controlled-temperature enclosure, each device itself being characterized by a defined melting temperature of the substance.

20. The method according to claim 10 wherein said one or more devices may furthermore be combined with another system of checking the temperature.

21. The method according to claim 10, wherein a device according to claim 1 is used with a telltale device consisting of a reservoir made of a material allowing heat exchange with the outside and of a content made of a solidified material which has a constant melting temperature and is held in place in the upper part of the reservoir.

22. The method of claim 20, wherein said another system of checking the temperature is a recording thermometer, a self-adhesive indicator, or a heat-sensitive ink.

* * * * *